United States Patent [19]
Gibble et al.

[11] 4,006,943
[45] Feb. 8, 1977

[54] FORMED ONE-PIECE HOLLOW ROLLER SHAFT

[75] Inventors: Lawrence W. Gibble; Dennis Lee Keesey, both of York, Pa.

[73] Assignee: Caterpillar Tractor Co., Peoria, Ill.

[22] Filed: Sept. 8, 1975

[21] Appl. No.: 611,194

Related U.S. Application Data

[62] Division of Ser. No. 421,120, Dec. 3, 1973, Pat. No. 3,927,449.

[52] U.S. Cl. .............................. 308/103; 308/130; 308/203
[51] Int. Cl.² .......................................... F16C 1/24
[58] Field of Search ............ 308/20, 103, 130, 203; 305/14

[56] References Cited
UNITED STATES PATENTS

| | | | |
|---|---|---|---|
| 1,911,171 | 5/1933 | Bernhard | 308/203 |
| 2,926,968 | 3/1960 | Toth | 308/130 X |
| 3,116,957 | 1/1964 | Fikse | 308/103 |

*Primary Examiner*—Joseph F. Peters
*Assistant Examiner*—Gene A. Church
*Attorney, Agent, or Firm*—Phillips, Moore, Weissenberger, Lempio & Strabala

[57] ABSTRACT

An article in the form of a one-piece, hollow, elongated body having an enlarged center portion and narrowed or necked down end portions is provided. The hollow roller shaft having an internal, centrally disposed lubricant cavity within a central body and a pair of shaft journals extending therefrom.

4 Claims, 12 Drawing Figures

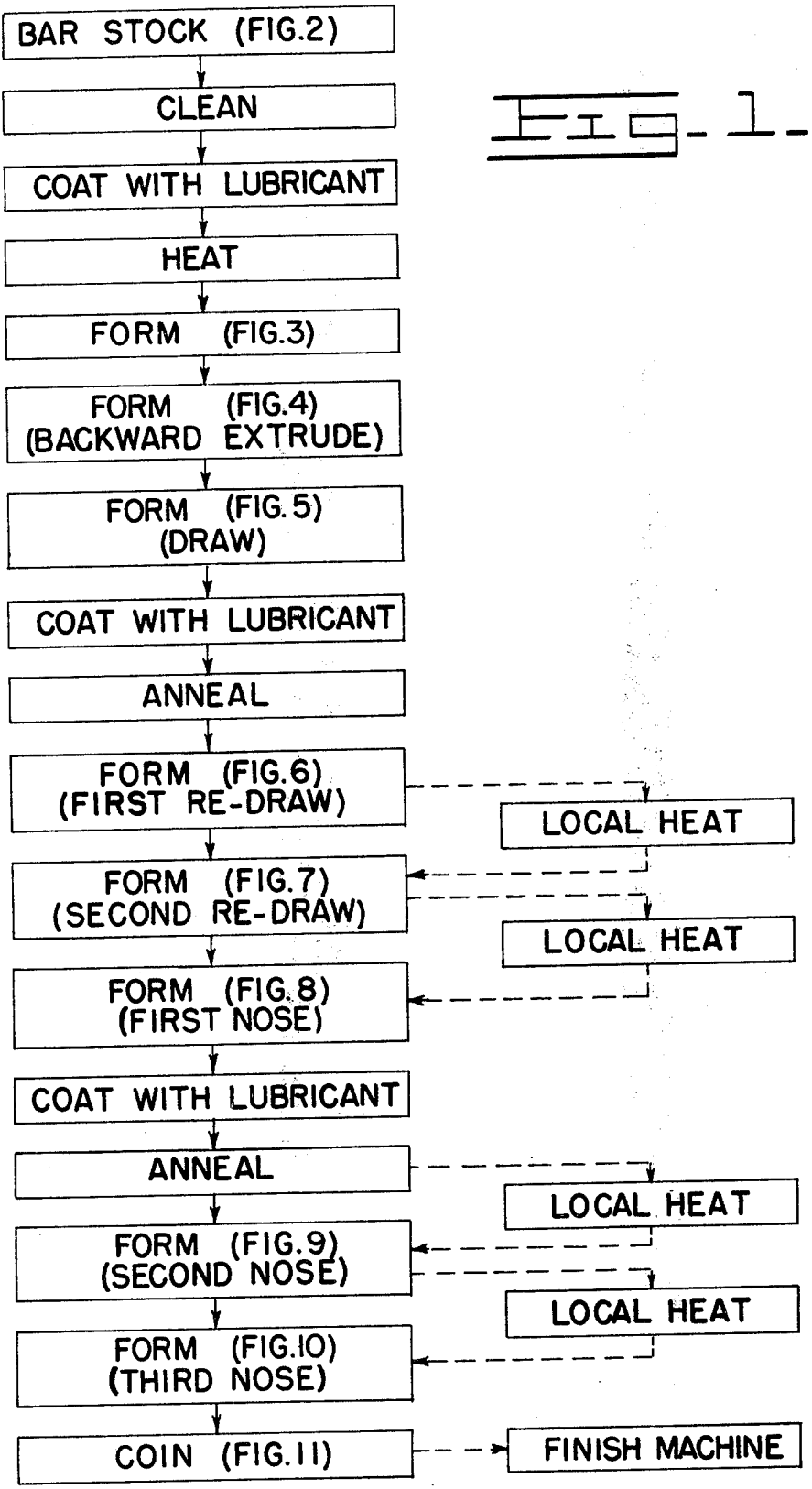

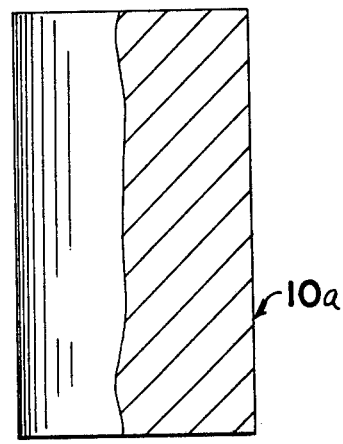
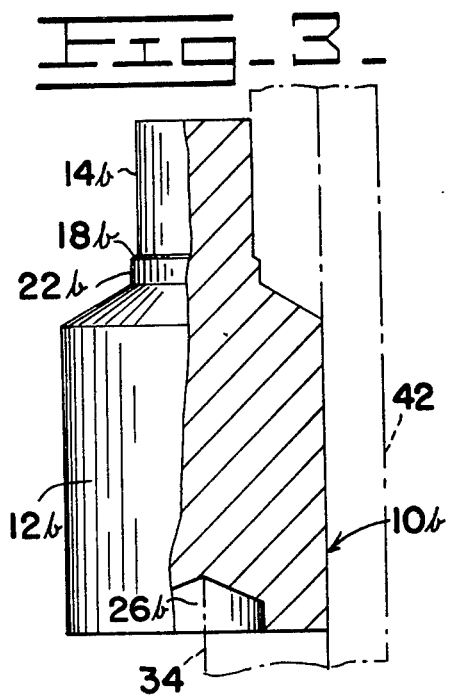
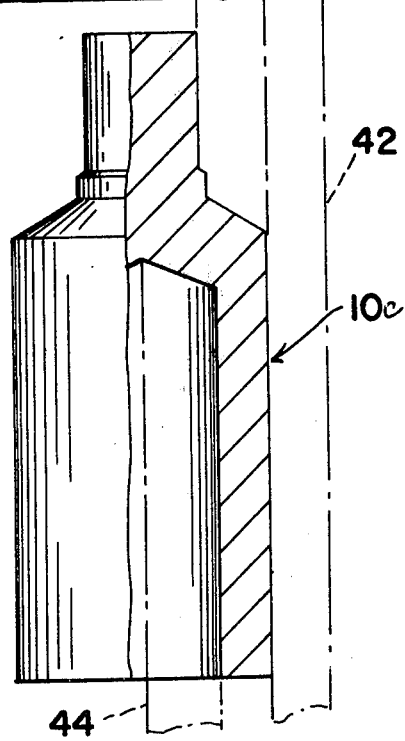
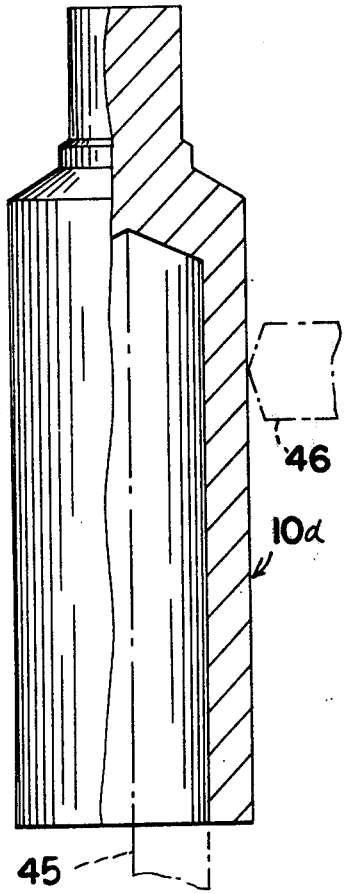

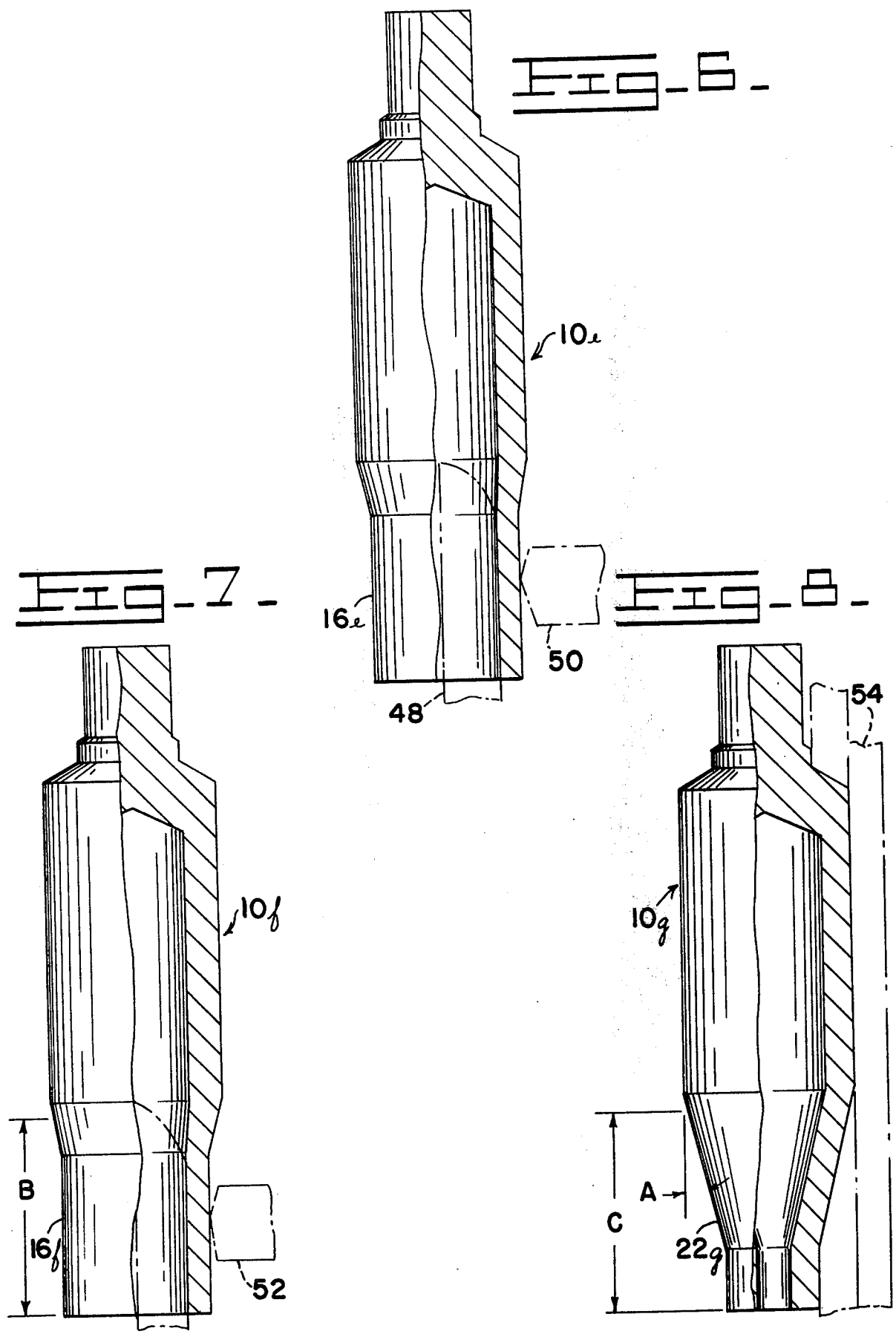

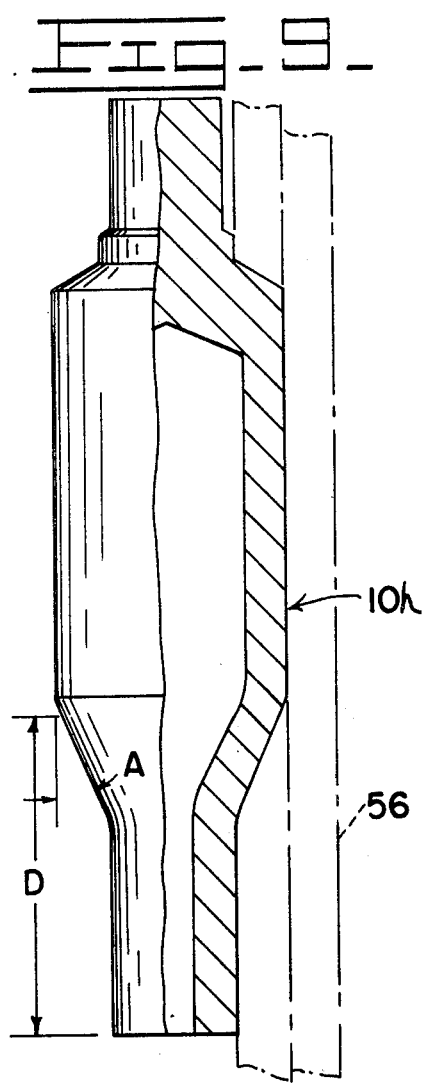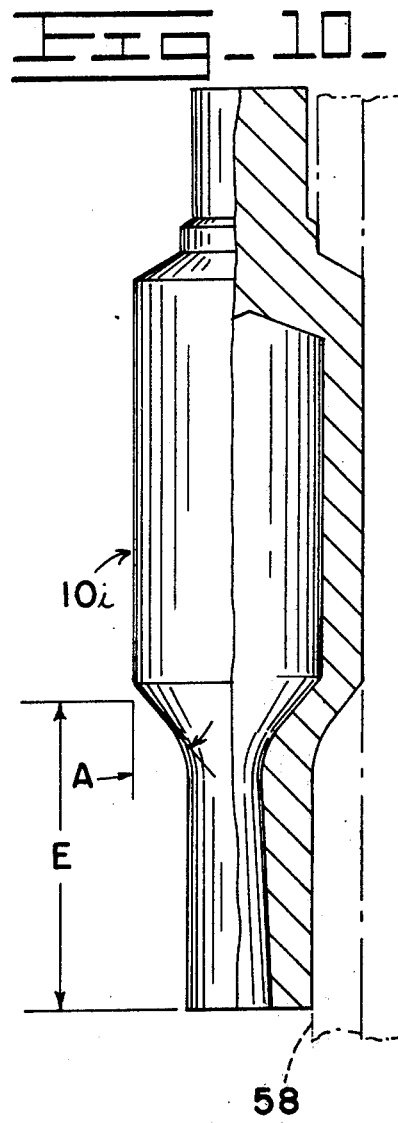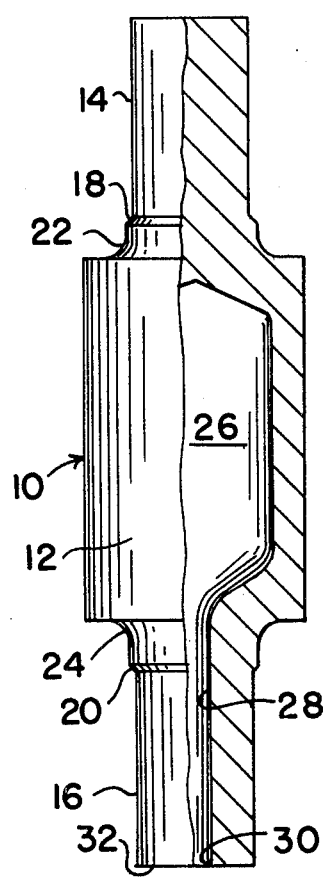

FORMED ONE-PIECE HOLLOW ROLLER SHAFT

This is a division, of Ser. No. 421,120, now U.S. Pat. No. 3,927,449, filed Dec. 3, 1973.

BACKGROUND OF THE INVENTION

This invention relates to an article in the form of a one-piece, hollow member having an enlarged center portion and narrowed or necked down end portions.

More particularly, this invention is directed to forming a hollow, one-piece shaft having an enlarged center portion and necked down end portions from a metal slug. While the following discussion concerns hollow shaft rollers, it is to be understood that this is for convenience only, and that other articles of varying shapes and applications are contemplated by this invention.

Prior to the advent of this invention, hollow roller shafts, as shown in U.S. Pat. Nos. 1,911,171; 2,054,532; 2,283,871; 2,349,898; 2,362,443; 2,647,025; 2,890,933; and 2,926,968, were manufactured by various methods. Principally, these methods involve casting with subsequent machining or forming with subsequent machining. Some involve additional steps of welding and finish machining where individual parts are combined to form the finished roller shaft. The formation of the external dimensions as well as the internal hollow or chamber, frequently internal cavities used as lubricant reservoirs, is costly both in time and materials. In addition, other disadvantages of the prior art include the presence of unrelieved residual stresses in the completed shafts that materially reduce strength and consequent wear life.

It is to an elimination of these disadvantages of the prior art that this invention is directed. The invention provides and an article in the form of a generally cylindrical, hollow roller shaft having an intermediate enlarged portion and being of unitary, one-piece construction formed by a particular method. The method is practiced by beginning with a metal slug and cleaning, coating with lubricant, heating and forming on a press by a series of forming operations. These forming operations include: pre-forming; backward extruding; drawing; re-drawing; nosing and coining. Intermediate steps are provided which include: annealing including local heat application; cleaning and coating.

It is therefore the primary object of this invention to provide a formed, one-piece hollow member having an enlarged center portion.

It is a further object of this invention to provide an article in the form of a formed one-piece hollow roller shaft which has reduced residual stresses and increased wear and resistance to load failure.

It is a further object of this invention to provide a hollow elongated member having an enlarged center portion and narrowed portions at opposite ends thereof.

It is a further object of this invention to provide forming a hollow shaft of one-piece construction having stepped end portions.

It is a further object to provide a hollow reservoir in a one-piece shaft by starting with a solid slug.

It is a still further object to provide a hollow shaft to closely controlled tolerances and having a minimum of inherent residual stress.

Other objects and advantages of the present invention will become apparent upon having reference to the accompanying drawings and the following description.

BRIEF DESCRIPTION OF THE DRAWINGS

FIG. 1 is a schematic diagram of the method steps in forming a hollow, one-piece roller shaft;

FIG. 2 is a side elevational view of a bar stock blank in partial cross-section which is employed in the subsequent forming steps;

FIG. 3 is a side elevational view in partial cross-section of the blank of FIG. 2 after an initial pre-forming operation;

FIG. 4 is a side elevational view in partial cross-section of the blank after a backward extrusion operation;

FIG. 5 is a side elevational view in partial cross-section of the blank after a drawing operation;

FIG. 6 is a side elevational view in partial cross-section of the blank after a first re-drawing operation;

FIG. 7 is a side elevational view in partial cross-section of the blank after a second re-drawing operation;

FIG. 8 is a side elevational view in partial cross-section of the blank after a first nosing operation;

FIG. 9 is a side elevational view in partial cross-section of the blank after a second nosing operation;

FIG. 10 is a side elevational view in partial cross-section of the blank after a thiro nosing operation;

FIG. 11 is a side elevational view in partial cross-section of the blank after a final coining operation; and, FIG. 12 is an elevational view in partial cross-section of a hydraulic press engaged in a forming operation.

DETAILED DESCRIPTION

Figure 12:
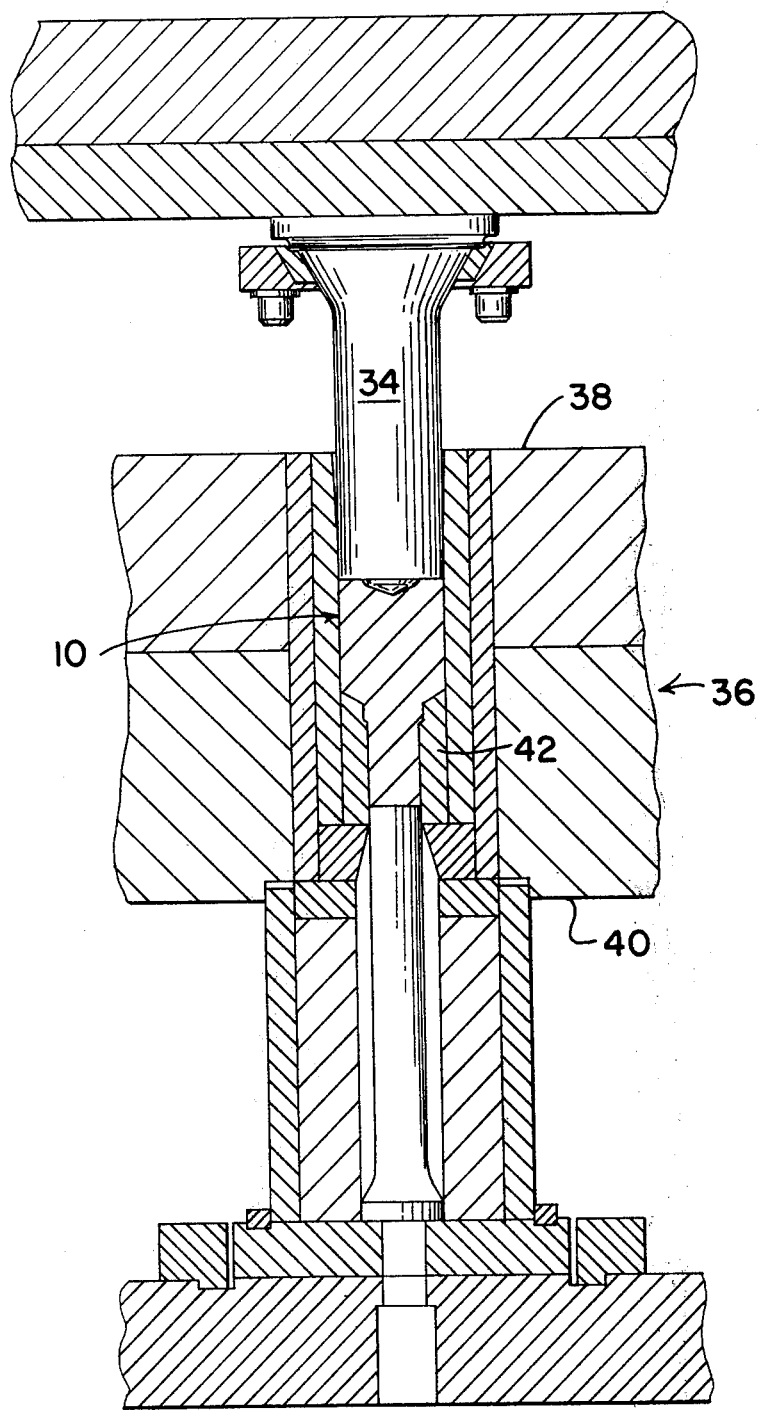

Turning to the drawings and in particular FIG. 1, there is shown in schematic form the method steps used to produce the hollow roller shaft shown in FIG. 11. As seen in the latter figure, the shaft or member 10 thus produced in an elongated member having a cylindrical central body portion 12 and narrowed or necked down cylindrical end or journal portions 14, 16. The transition between the end or journal portions and the body portion is made by a chamfer 18, 20 and a curved portion 22, 24, respectively. Formed within the body portion is a generally cylindrical, centrally disposed internal hollow or cavity 26. The purpose of the cavity is to be a reservoir for storage of lubricant for transmission to the shaft journal portions by way of lubricant passages therein (not shown). A fill passage 28 connects the cavity with the shaft exterior to facilitate filling through a plug or other valve means (not shown) which is provided to close opening 30 in the end 32 of the shaft, The steps of manufacture of the shaft are as follows. First, a solid cylindrical slug or blank 10a as shown in FIG. 2 is provided such as by cutting off a length of material from a piece of bar stock. Suitable material would be carbon steel, e.g. S.A.E. 1042 carbon steel.

Second, the blank is cleaned to remove scale, oxidation, and surface contamination. Cleaning may be accomplished by shot peening the blank and may be followed by washing in water with a commercial soap solution to remove any surface contamination such as residual oil or other lubricant.

Third, the cleaned blank is coated with a lubricant. Dipping or otherwise immersing the cleaned blank in a commercially available collodial graphite compound has been found to be sufficient to reduce surface friction and prevent bonding during subsequent forming operations. Other suitable lubricants may also be used.

After coating, heating of the cleaned and coated blank is accomplished. The slug is heated in a furnace to a temperature of approximately 1400° F. The heated slug is then removed and placed in a press such as shown in FIG. 12, employing a conventional punch 34 and die assembly 36 comprising die blocks 38, 40 and die 42.

The heated blank is then formed to a pre-form shape as seen in FIG. 3 bearing journal portion 14b, transition portions 18b, 22b, and body portion 12b. The punch end also forms cavity 26b.

The punch is then indexed and replaced by a centrally disposed cylindrical mandrel — having a diameter equal to the desired cavity diameter. The step of backward extrusion of the still heated pre-formed blank is then accomplished to form the shape shown in FIG. 4.

Mandrel 44 is then withdrawn and replaced by a slightly smaller diameter mandrel 45. The member 10d is then drawn through an extrusion die 46. This drawing operation reduces the wall thickness and elongates the member 10d as seen in FIG. 5. This operation also establishes the nominal internal and external diameters of the finished shaft. After this, the partially formed shaft is coated with lubricant in the manner aforementioned and annealed by heating to temperature of approximately 1400° F.

The mandrel is then indexed and replaced with a mandrel 48 having a diameter slightly less than that of mandrel 45 and the member drawn through successively smaller forming dies 50, 52, as seen in FIGS. 6 and 7, respectively. These first and second re-drawing operations produce a reduced end portion 16e, 16f, as shown in FIGS. 6 and 7, respectively.

The member 10g is then formed by nosing in an appropriately shaped die piece 54 to produce a portion 22g having a taper angle A of approximately 13° as seen in FIG. 8. After re-coating with lubricant and annealing at 1400° F in the manner aforementioned, the taper is incrementally increased by second and third nosing operations in successive die pieces 56, 58, to produce taper angles A of 25° and 40°, respectively.

The member is then pressed into its final configuration as shown in FIG. 11, by a coining operation. If necessary, finish machining to final tolerances can then optionally be accomplished, as indicated by dotted lines in FIG. 1.

The article thus provided is a formed, one-piece hollow roller shaft of integral, one-piece and homogenous construction. The forming of the shaft provides reduced residual stresses as well as increased wear and resistance to load failure.

As also indicated in the same manner, intermediate localized heating steps can also be performed prior to the second re-draw operation and before the nosing operations, in order to facilitate these operations. The local heating may be conveniently accomplished by heating all around the member with a torch in the areas B, C, D and E, as seen in FIGS. 7–10, respectively.

Although the invention has hereinbefore been described and illustrated in the accompanying drawings with respect to a specific application, various modifications and changes may be made therein without departing from the scope and spirit of the invention, and thus it is not intended to limit the invention except by the terms of the appended claims.

What is claimed is:

1. A formed, hollow roller shaft of integral, one-piece construction comprising an elongated member having a cylindrical central body portion defining a first diameter and cylindrical journal portions extending from opposite ends of said central body portion, said journal portions each defining a diameter which is less than that of the central body portion, the diameters defined by each journal portion being substantially equal to each other, a transition portion between each of said journal portions and said central body portion, and a generally cylindrical, centrally disposed internal cavity for receiving lubricant formed entirely within said central body portion so as to define a closed chamber, whereby reduced residual stresses and increased wear and resistance to load failure are provided, and further including a formed lubricant fill passage centrally disposed within one of said journal portions intercommunicating said closed chamber with the shaft exterior in order to facilitate filling of said cavity with lubricant, and the other of said journal portions being free from cavities.

2. The article of claim 1 wherein said transition portions each comprise a curved portion.

3. The article of claim 2 wherein said transition portions each further comprise a chamfer.

4. The article of claim 3, wherein said shaft is of homogenous carbon steel material.

* * * * *

UNITED STATES PATENT OFFICE
CERTIFICATE OF CORRECTION

Patent No. 4,006,943     Dated Feb. 8, 1977

Inventor(s) Lawrence W. Gibble et al.

It is certified that error appears in the above-identified patent and that said Letters Patent are hereby corrected as shown below:

In the "Abstract", line 3, after "The" insert --article is in the form of --.

Col. 1, line 58, delete "form-";

Col. 1, line 59, delete "ing" at the beginning of the line.

Signed and Sealed this

Twelfth Day of February 1980

[SEAL]

Attest:

SIDNEY A. DIAMOND

Attesting Officer     Commissioner of Patents and Trademarks